(12) United States Patent
Kim

(10) Patent No.: US 11,311,016 B1
(45) Date of Patent: Apr. 26, 2022

(54) PREPARATION METHOD FOR PLANT DISEASE CONTROL COMPOSITION AND PLANT DISEASE CONTROL METHOD FOR SEED SOAKING USING THE SAME

(71) Applicant: Do Hyeon Kim, Gimpo-si (KR)

(72) Inventor: Do Hyeon Kim, Gimpo-si (KR)

( * ) Notice: Subject to any disclaimer, the term of this patent is extended or adjusted under 35 U.S.C. 154(b) by 0 days.

(21) Appl. No.: 17/403,370

(22) Filed: Aug. 16, 2021

(51) Int. Cl.
| | |
|---|---|
| *A01N 59/14* | (2006.01) |
| *A01N 59/26* | (2006.01) |
| *A01N 59/20* | (2006.01) |
| *A01P 15/00* | (2006.01) |

(52) U.S. Cl.
CPC ............. *A01N 59/14* (2013.01); *A01N 59/20* (2013.01); *A01N 59/26* (2013.01); *A01P 15/00* (2021.08)

(58) Field of Classification Search
None
See application file for complete search history.

(56) References Cited

FOREIGN PATENT DOCUMENTS

| CN | 101209938 | * | 7/2008 |
| FR | 2679552 | * | 1/1993 |

OTHER PUBLICATIONS

A.D. Avgelis et al., "Elimination of cucumber green mottle mosaic tobamovirus by composting infected cucumber residues", Acta Horticulturae 302, 1992, pp. 311-314.
Gug-Seoun Choi, "Occurrence of two tobamovirus diseases in cucurbits and control measures in Korea", Plant Pathol. J., Aug. 24, 2001, pp. 243-248, vol. 17, No. 5.

* cited by examiner

*Primary Examiner* — John Pak
(74) *Attorney, Agent, or Firm* — Paratus Law Group, PLLC

(57) ABSTRACT

Disclosed is a plant disease control composition for soaking virus-infected plant seeds. The plant disease control composition is a composition including nitrogen, phosphate, potassium oxide, manganese, molybdenum, zinc, boron, copper, and a surfactant and characterized by exhibiting an effect on the diseases of cucurbitaceae or solanaceae crops. A plant disease control method for seed soaking involves soaking seeds in a plant disease control composition including nitrogen (N), phosphoric anhydride ($P_2O_5$), potassium oxide ($K_2O$), boron (B), manganese (Mn), molybdenum (Mo), zinc (Zn), copper (Cu), and a surfactant to control plant diseases.

2 Claims, 10 Drawing Sheets

PREPARATION METHOD FOR PLANT DISEASE CONTROL COMPOSITION AND PLANT DISEASE CONTROL METHOD FOR SEED SOAKING USING THE SAME

BACKGROUND

The present invention relates to a plant disease control composition for soaking virus-infected plant seeds. More specifically, the plant disease control composition is a composition including nitrogen, phosphate, potassium oxide, manganese, molybdenum, zinc, boron, copper, and a surfactant and characterized by exhibiting an effect on the diseases of cucurbitaceae or solanaceae crops.

Plant viruses, called plant ADIS, are obligate intracellular parasites that replicate only in living plant cells and cause diseases. With their strong infectivity and proliferative power, they cause considerable economic losses in the production of agriculture. As of 2014, about 1,200 species of plant viruses have been found worldwide and reported to cause an estimated economic loss of more than 60 trillion in KRW (South Korean wons) in crop yields and quality worldwide each year. Korea also suffers more than KRW 900 billion in damage from about 150 species of plant viruses every year. The risk of introducing new viruses is on the rise as the introduction and cultivation of tropical and subtropical crops increases due to the climate warming phenomenon and the increased volume of plant trade in the agriculture between countries according to the Free Trade Agreement (FTA). This leads to the potential to increase damages that have never been addressed as an issue.

Unlike fungi or bacteria, plant viruses are generally untreatable in a practical manner upon entry into plants, and there is currently no control agent for the infected plants in the world. Hence, the present invention is to provide a vaccine composition for control against tobamovirus genus that has virostatic effects of inhibiting the replication of the viruses affecting the crops and the transmission of the viruses from the inner and outer coats of seeds to seedlings, a treatment effect against plant viruses, and a promoting effect on the growth of plants.

The production and distribution of seeds is not limited to a single country, but trade of seeds is taking place all over the world. In this situation, seed-borne plant viruses are one of the significant threats to global agriculture. Species belonging to the tobamovirus genus are considered the main seed-borne viruses, especially infecting solanaceae and cucurbitaceae crops.

Tobacco mosaic virus (TMV), Tobacco mild green mosaic virus (TMGMV), Tomato mosaic virus (ToMV), and Pepper mild mottle virus (PMMoV) occur on the solanaceae crops, such as tomatoes, tobaccos, and peppers. Since 2015, in particular, Tomato brown rugose fruit virus (ToBRFV) has emerged as a major devastating threat in Europe.

Cucumber mosaic virus (CMV), Cucumber green mottle mosaic virus (CGMMV), Kyuri green mottle mosaic virus (KGMMV), Zucchini green mottle mosaic virus (ZGMMV), or the like are found in the cucurbitaceae crops, such as cucumbers, watermelons, and melons.

RELATED ART DOCUMENTS (Non-Patent Document 1) Avgelis, A. D. and V. I. Manios. 1992. Elimination of cucumber green mottle mosaic tobamovirus by composting infected cucumber residues. Acta Hort. (ISHS) 302:311-314.

(Non-Patent Document 2) Choi, G. S. 2001. Occurrence of two tobamovirus diseases in cucurbits and control measures in Korea. Plant Pathol. J. 17:243-248.

SUMMARY

The present invention has been devised to solve the problems with the prior art. It is accordingly an object of the present invention to provide a plant disease control composition capable of dramatically reducing the rate of seed transmission that accounts for a significant portion as a primary means of viral transmission.

The above object of the present invention is not intended as a definition of the limits of the invention. The above and other objects of the invention will become apparent to those skilled in the art from the following description of embodiments.

In the present invention, there is provided a method for preparing a plant disease control composition for seed soaking. The plant disease control composition is prepared by mixing nitrogen (N), phosphoric anhydride ($P_2O_5$), potassium oxide ($K_2O$), boron (B), manganese (Mn), molybdenum (Mo), zinc (Zn), copper (Cu), and a surfactant.

The plant disease control composition for seed soaking may be prepared by a method that includes: (1) dissolving boron (B) and molybdenum (Mo) in an acidic water at 35 to 45° C. to form a first aqueous solution; (2) dissolving copper (Cu) and manganese (Mn) in the first aqueous solution under agitation at a rate of 1,700 to 1,750 rpm/min$^{-1}$ at 20 to 60° C. to form a second aqueous solution; (3) dissolving potassium oxide ($K_2O$) and nitrogen (N) in the second aqueous solution at 30 to 40° C., carrying out agitation at a rate of 1,700 to 1,750 rpm/min$^{-1}$ at 20 to 25° C. to form a third aqueous solution, allowing natural sedimentation for 8 to 12 hours, and then carrying out a centrifugation to prepare a first pure undiluted solution; (4) dissolving phosphoric anhydride ($P_2O_5$) and zinc (Zn) under separate agitation at 30 to 40° C. to form a fourth aqueous solution; (5) allowing natural sedimentation of the fourth aqueous solution containing a mixture of phosphoric anhydride ($P_2O_5$) and zinc (Zn) and carrying out a centrifugation to prepare a second pure undiluted solution; and (6) aging the second pure undiluted solution at low temperature of 10 to 15° C.

According to the solution to the problem with the prior art, the present invention has virostatic effects of inhibiting the virus replication and the transmission of viruses in the plants, alleviating the symptoms in the infected plants, and suppressing the spread of viruses to healthy plants by mechanical contact.

The present invention also has an effect of preventing the occurrence of virus when used before the occurrence of the virus infection.

The present invention also has an effect of accelerating the crop growth to promote the plant growth.

DETAILED DESCRIPTION

Figure 1A:
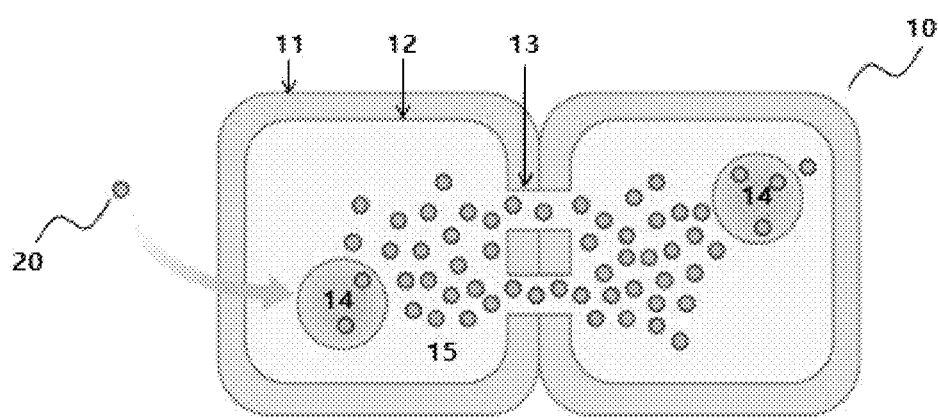
FIG. 1A is a mimetic diagram showing the general mechanism of virus replication (cell-to-cell movement) in a plant.

Hereinafter, the terminology used in this specification will be described briefly, and the present invention will be described in further detail.

The terms used in the present invention have been selected as currently widely used general terms as possible while considering the functions in the present invention, which may vary depending on the intention or precedent of a person skilled in the art, the emergence of new technology, and the like. Therefore, the teen used in the present invention should be defined based on the meaning of the term and the overall content of the present invention, rather than the name of a simple teen.

It will be further understood that the terms "comprises" and/or "comprising" used in this specification specify the presence of stated component but do not preclude the presence of one or more other components.

Hereinafter, the present invention will be described in further detail with reference to the preferred embodiments in order for those skilled in the art to embody the present invention with ease. However, it is to be noted that the present invention is not limited to the embodiments as disclosed herein but can be embodied in various other ways.

Specific details including the objects, solutions and effects of the present invention are included in the embodiments and drawings to be described below. Advantages and features of the present invention and methods for achieving them will be more clearly understood with reference to the embodiments described below in conjunction with the accompanying drawings.

The Cucurbitaceae family consists of about 800 species across 118 genera. Most of the plants in this family are annuals native to temperate and tropical areas (Jeffrey, 1980). The main crops belonging to this family are watermelons (*Citrullus lanatus* (Thumb.) Matsum. & Nakai.), squashes (*Cucurbita* spp.), cucumbers (*Cucumis sativus* L.), and melons (*Cucumis melo* L.). The cucurbitaceae crops not only generate profits for farmers, but also create large profits for the seed industry. For example, the global production of major cucurbitaceae crops in 2013 represents about 30% of the total vegetable production (FAO, 2013): 109 million tons of watermelons, 71 million tons of cucumbers, 29 million tons of melons, and 24 million tons of squashes. The cucurbitaceae crops have steadily improved in terms of quality and quantity through development of varieties and cultivation techniques. Yet, they still have problems of persistent insect infestation and diseases.

When it comes to the insect infestation and disease on cucurbitaceae crops, there are more than 30 virus species known to infect cucurbitaceae crops (Povvienti, 1993), including Cucumber mosaic virus (CMV), Cucumber green mottle mosaic virus (CGMMV), Kyuri green mottle mosaic virus (KGMMV), and Zucchini green mottle mosaic virus (ZGMMV).

Among these viruses, Cucumber green mottle mosaic virus (hereinafter, referred to as "CGMMV"), a member of the genus Tobamovirus, is a very stable rod-shaped virus about 300 nm in size. First reported in England in 1935, it now occurs in many countries, including European countries, India, Japan, and Saudi Arabia. CGMMV is a virus transmitted by seeds, soil, and sap, and the primary means of transmission for CGMMV is seed transmission (Choi, 2001; Liu et al., 2013; Wu et al., 2011). Seed transmission occurs on crops in their early stage and serves as a means of viral transmission during the cultivation period. The secondary transmission is mainly contact transmission that involves transmitting virus throughout the field through cultivation operations. It is therefore of great importance to block seed contamination, the primary means of transmission for CGMMV. The CGMMV-infected cucurbitaceae crops have an disease incidence of 84 to 100% and a seed-to-seedling transmission rate of 0.9 to 8%, which suggests that the proportion of CGMMV-infected seedlings is extremely lower than that of CGMMV-infected seeds (Garcia-Randez A et al., 2007; Reingold V et al., 2015; Shargil D et al., 2017). Yet, as described above, CGMMV can spread throughout the field despite the low seed transmission rate due to its structural and overall characteristics.

For prevention of the Cucumber green mottle mosaic virus (CGMMV), it is ideal to produce and use disease-free seeds in a fundamental way. In reality, however, it is very difficult to produce 100% disease-free seeds due to the environment of the seed-production areas that are usually exposed to a lot of external factors. Hence, inactivation of pathogens through seed treatment is inevitable. Dry heat treatment is known as one of the effective treatments for inactivation of seed-borne viruses on cucurbitaceae crops (Kim et al., 2003; Nakamura, 1982). According to a report claiming that 2 days of dry heat treatment at 72° C. can inactivate CGMMV (Avegelis and Manios, 1992), most of the seedling companies conduct seed treatment at 72° C. for 3 days, which is recommended for safe inactivation of CGMMV (IPET, 2003). But, there is a report claiming that the temperatures of 75° C. and 80° C. can delay seed germination or affect the growth after germination (Fletcher et al., 1969). Also, depending on the crops or varieties, an abrupt change in the temperature during dry heat treatment may decrease germination energy and germination rate or increase the occurrence of abnormal seedlings.

As a large-scale occurrence of CGMMV was reported in major overseas seed-production areas such as China, the Middle East, and India (Kim et al., 2010; Nematollahi et al., 2013; Yoon et al., 2008; Zhang et al., 2009), it has been proven that the existing seed treatment methods for suppressing the onset of CGMMV are ineffective (Rast ATB, 1987). In reality, it is not easy to manage seed production such as selecting non-contaminated seed-production sites for disease-free seed production. Seed disinfection and seed treatment methods have been continuously researched and developed. Still, there is no perfect disinfection treatment, and the existing methods involve simply deteriorating the activity of pathogens or reducing the density of pathogens (Kim and Lee, 2000).

It is also known that there are more than 3,000 species of solanaceae plants, one of the plant groups in which speciation occurred most diversely in the evolutionary process. These solanaceae plants include lots of important economic crops, such as peppers, potatoes, tobaccos, and tomatoes, and those crops are used as important elements of foods, spices and medicines. Among these, tomatoes are an economically important vegetable with annual global trade of 10 trillion in KRW.

The biggest problem that hinders the growth of solanaceae plants during cultivation is bacterial and viral diseases mediated by seeds, which becomes problematic from the initial growth stage and consequently disrupts the harvest of crops, causing a huge economic damage. Among the seed-borne pathogens of solanaceae crops, the main viral pathogens are Tobacco mosaic virus (TMV), Tobacco mild green mosaic virus (TMGMV), Tomato mosaic virus (ToMV), and Pepper mild mottle virus (PMMoV) (Kim et al., 2006). Another seed-borne virus is Tomato brown rugose fruit virus (ToBRFV), which was first reported in Jordan in 2016 and became the most devastating problem in Europe in 2021 (Salem N. et al., 2016).

These viruses are RNA viruses belonging to the tobamovirus genus and transmitted by soil and seeds to cause a problem in global production and harvest of solanaceous crops and consequently enormous economic losses worldwide (Kim et al., 2006).

Hereinafter, the present invention will be described in further detail with reference to the accompanying drawings.

The method for preparing a plant disease control composition for seed soaking according to the present invention may be performed in the following procedures. The present invention is to prepare a plant disease control composition for seed soaking by dissolving nitrogen (N), phosphoric anhydride ($P_2O_5$), potassium oxide ($K_2O$), boron (B), manganese (Mn), molybdenum (Mo), zinc (Zn), copper (Cu), and a surfactant. More specifically, the plant disease control composition for seed soaking may be prepared by mixing 0.2 to 3.5 parts by weight of the phosphoric anhydride ($P_2O_5$), 0.1 to 1.0 part by weight of the potassium oxide ($K_2O$), 0.05 to 1.5 part by weight of the boron (B), 0.05 to 1.5 part by weight of the manganese (Mn), 0.0005 to 0.0015 part by weight of the molybdenum (Mo), 0.05 to 3.0 parts by weight of the zinc (Zn), and 0.05 to 3.0 parts by weight of the copper (Cu), with respect to 0.1 part by weight of the nitrogen (N).

The first step S10 involves dissolving boron (B) and molybdenum (Mo) in an acidic water at 35 to 45° C. to form an aqueous solution, which is then left to undergo natural sedimentation for 3 to 7 hours. 70% of the supernatant is collected as a first aqueous solution.

In the first step S10, when boron (B) and molybdenum (Mo) are dissolved in an acidic water at a temperature lower than 35° C., the solubility may be insignificant; whereas, when boron (B) and molybdenum (Mo) are dissolved in an acidic water at a temperature higher than 45° C., heat and gas may be generated from the metal oxidation reaction to cause a safety issue. It is therefore preferable to perform the procedure under the conditions as defined above.

In the first step S10, when the natural sedimentation is allowed for less than 3 hours, it may occur insignificantly; whereas when the natural sedimentation is allowed for more than 7 hours, the efficiency may be reduced. It is therefore preferable to perform the procedure under the conditions as defined above.

The second step S20 involves dissolving copper (Cu) and manganese (Mn) in the first aqueous solution while continuously agitating the first aqueous solution at 20 to 60° C. to prepare a second aqueous solution. More specifically, copper (Cu) and manganese (Mn) are dissolved in the first aqueous solution of the step S10, during which the first aqueous solution is agitated at a rate of 1,700 to 1,750 rpm/min$^{-1}$ under temperature conditions maintained at 20 to 60° C.

In the second step S20, when the agitation is carried out at a temperature lower than 20° C., the solubility may be insignificant; whereas, when the agitation is carried out at a temperature higher than 60° C., heat and gas may be generated from a metal oxidation reaction to cause a safety issue. It is therefore preferable to perform the procedure under the conditions as defined above.

In the second step S20, when the agitation is carried out at a rate of less than 1,700 rpm/min$^{-1}$, the second aqueous solution may be susceptible to agglomeration; whereas, when the agitation is carried out at a rate of higher than 1,750 rpm/min$^{-1}$, the ability of the plant disease control composition to have its components adhere to each other may be insignificant. It is therefore preferable to perform the procedure under the conditions as defined above.

The third step S30 involves dissolving potassium oxide ($K_2O$) and nitrogen (N) in the second aqueous solution at 30 to 40° C., carrying out agitation at 20 to 25° C. to form a third aqueous solution, allowing natural sedimentation for 8 to 12 hours, and then carrying out a centrifugation to prepare a first pure undiluted solution. More specifically, potassium oxide ($K_2O$) and nitrogen (N) are dissolved in the second aqueous solution under agitation while maintaining the agitation rate of the second step S20.

In the third step S30, when the natural sedimentation is allowed for less than 8 hours, it may occur insignificantly; whereas when the natural sedimentation is allowed for more than 12 hours, the efficiency may be reduced. It is therefore preferable to perform the procedure under the conditions as defined above.

The fourth step S40 involves dissolving phosphoric anhydride ($P_2O_5$) and zinc (Zn) at 30 to 40° C. under separate agitation to form a fourth aqueous solution.

More specifically, when dissolution of phosphoric anhydride ($P_2O_5$) and zinc (Zn) is completed in the fourth aqueous solution, agitation is carried out at the same agitation rate of the second step S20 for 60 to 70 minutes at temperature of 20 to 25° C. The above-defined conditions ensure the plant disease control composition of the present invention to spread uniformly and adhere well to the surface of the crops or infecting viruses and promote the ability of the plant disease control composition of the present invention to have its components adhere to each other.

The fifth step S50 involves allowing natural sedimentation of the fourth aqueous solution containing a mixture of phosphoric anhydride ($P_2O_5$) and zinc (Zn) and carrying out a centrifugation to prepare a second pure undiluted solution. More specifically, upon completion of the agitation in the fourth step S40, the fourth aqueous solution is left to undergo natural sedimentation for 8 to 12 hours and then subjected to centrifugation. The impurities that settle down on the bottom of the solution are removed from the agitation container. 70% of the supernatant is collected as a second pure undiluted solution.

Preferably, the copper (Cu), an important energy source in the plant, is slowly added to the impurity-removed second pure undiluted solution at a rate of 0.2 ml/sec under continuous agitation at the same agitation rate of the second step S20 for 60 minutes or longer.

In the fifth step S50, when the natural sedimentation is allowed for less than 8 hours, it may occur insignificantly; whereas when the natural sedimentation is allowed for more than 12 hours, the efficiency may be reduced. It is therefore preferable to perform the procedure under the conditions as defined above.

The sixth step S60 involves aging the second pure undiluted solution at low temperature of 10 to 15° C. to complete a plant disease control composition. More specifically, the second pure undiluted solution is aged at low temperature of 10 to 15° C. for 24 to 72 hours to prepare a plant disease control composition of the present invention.

In the sixth step S60, when the aging process is carried out at a temperature lower than 10° C., it may occur insignificantly; whereas when the aging process is carried out at a temperature higher than 15° C., the aging efficiency may be lowered. It is therefore preferable to perform the procedure under the conditions as defined above.

Subsequently, the first pure undiluted solution of the third step S30 and the second pure undiluted solution of the sixth step (S60) separately prepared are mixed together. The mixture is used for seed soaking. Preferably, the first and second pure undiluted solutions are mixed in equal amounts and put into use for seed soaking.

The plant disease control composition contains a surfactant, which contributes to high penetration performance of the composition, helping the other components reach the viruses present in the inner and outer seed coats of the plant with ease and render them inactive. The surfactant maintains the chelate compound, phosphoric anhydride ($P_2O_5$), in a uniform dispersion state. Further, the composition is highly hydrophilic, which helps ions used as active components uniformly disperse and penetrate into the whole plant and the seeds.

The plant disease control composition prepared by the method for preparing a plant disease control composition for seed soaking preferably has a pH of 1.0 to 4.5, more preferably a pH of 0.5 to 2.5. In order for the stable pH balance of this composition to maintain plant growth and prevent occurrence of virus, the composition is required to be at an appropriate pH and non-toxic for the sake of securing safety for animals and plants. The proper temperature and pH are of a great importance for complete dissolution and adherence of the mixed compositions. It is therefore desirable to stabilize the pH of the solution containing the compositions in the range from pH 1.0 to 4.5. Further, buffering may help maintain the compositions stable and chelated.

In addition, the plant disease control method for seed soaking according to the present invention has the same configuration of the plant disease control composition as described above.

More specifically, 200 parts by weight of water is mixed with respect to 1 part by weight of the plant disease control composition containing nitrogen (N), phosphoric anhydride ($P_2O_5$), potassium oxide ($K_2O$), boron (B), manganese (Mn), molybdenum (Mo), zinc (Zn), copper (Cu), and a surfactant. Preferably, the resultant solution is used to soak the seeds of crops for 90 minutes.

The present invention is effective against the plant diseases of cucurbitaceae or solanaceae crops, and most effective against those of cucurbitaceae crops, including watermelons (*Citrullus lanatus* (Thumb.) Matsum. & Nakai.), squashes (*Cucurbita* spp.), cucumbers (*Cucumis sativus* L.), and melons (*Cucumis melo* L.).

The present invention has a prevent effect against seed-borne viruses causing diseases in the cucurbitaceae crops, such as Cucumber green mottle mosaic virus (CGMMV), Kyuri green mottle mosaic virus (KGMMV), and Zucchini green mottle mosaic virus (ZGMMV), and more preferably against Cucumber green mottle mosaic virus (CGMMV). The present invention also has a preventive effect against seed-borne viruses causing diseases in the solanaceae crops, such as Tobacco mosaic virus (TMV), Tobacco mild green mosaic virus (TMGMV), Tomato mosaic virus (ToMV), Pepper mild mottle virus (PMMoV), or Tomato brown rugose fruit virus (ToBRFV).

The present invention can prevent the occurrence of virus infection in crops by soaking the seeds. The use of the plant disease control composition in the treatment of seeds is desirable in preventing seed-borne viruses before transplanting in soil. It helps normal growth and development of seedlings using seed soaking of virus-infected seeds. Soaking virus-infected seeds in the plant disease control composition of the present invention prevents the onset of symptoms of virus infection even after transplantation of seedlings. This helps the normal harvest of crops, further reduces the occurrence of plant diseases in the case of transplantation and cultivation of germinated seedlings, and promotes the normal growth and development of the seedlings.

Unlike fungi or bacteria, plant viruses are generally untreatable in a practical manner upon entry into plants, and there is currently no control agent for the infected plants. In a host plant, plant viruses share metabolic processes with the cells of the host plant. Hence, selective control of virus alone is difficult to achieve. Plant viruses move from cells to cells in the plant. Yet, using the plant disease control composition of the present invention can stop the activity of viruses in the inner and outer coats of infected cucurbitaceous seeds, suppressing the movement of viruses from seeds to seedlings and preventing virus infection of the seedlings. That is, viral transmission is not allowed from seeds to seedlings. Also, the use of the plant disease control composition promotes plant growth and helps overcome viruses.

Figure 1B:
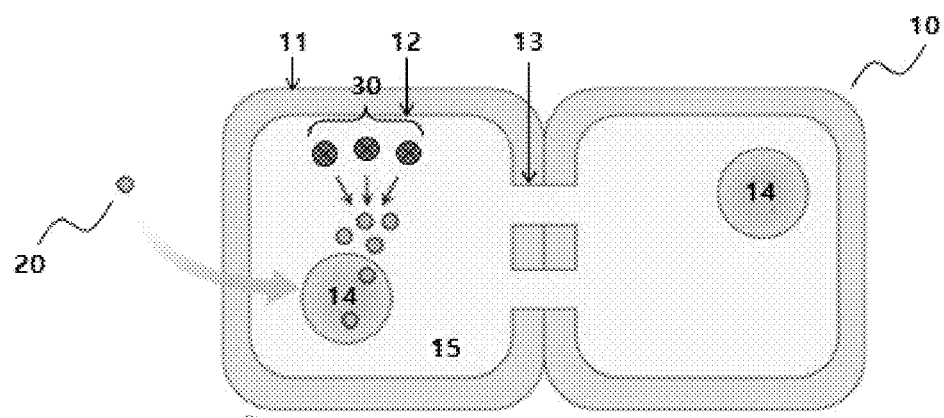
FIG. 1B is a mimetic diagram showing an virostatic effect according to an embodiment of the present invention.

More specifically, as shown in FIG. 1, the action mechanism of the plant disease control composition of the present invention inhibits the cell-to-cell movement of plant viruses through plasmodesmata 13. FIG. 1A illustrates a general mechanism of virus replication in a plant, and FIG. 1B shows the virostatic effect of the plant disease control composition of the present invention to stop the virus activity.

Referring to FIG. 1A, virus particles contaminating inner and outer seed coats infect a seedling cell and invade nucleus 14 of the seedling cell. As the nucleus 14 divides, the genetic material of the virus is also replicated into new virus particles 20. Thus, the virus particles 20 move from cells to cells through plasmodesmata 13 formed between host cells to cause viral infection throughout the plant. As shown in FIG. 1B, the plant disease control composition of the present invention stops the activity of virus particles 20 that have penetrated into cytoplasm 15 of the host cell, to prevent replication of the virus particles 20 and minimize the cell-to-cell movement of the virus particles 20.

Figure 2:
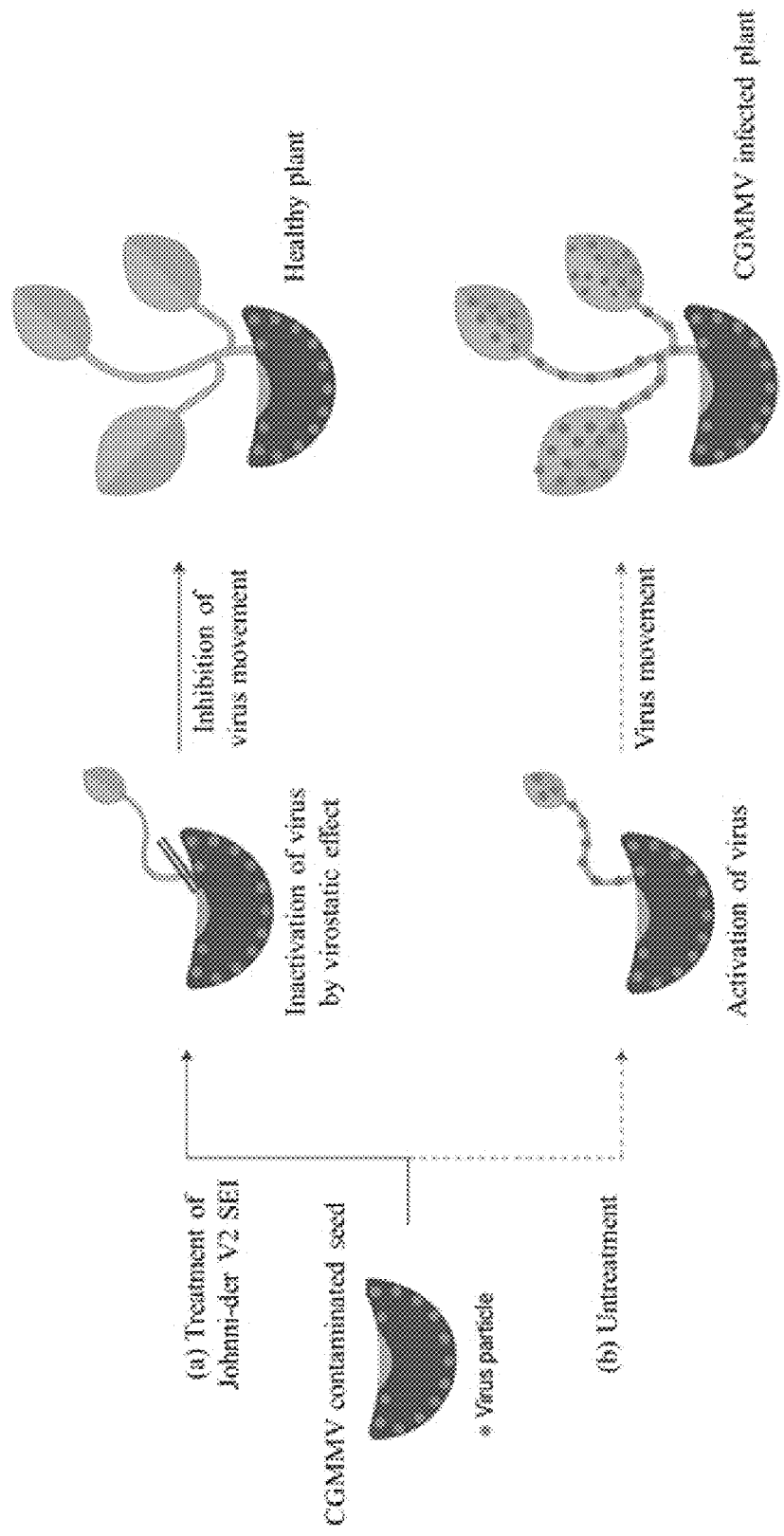
FIG. 2 is a mimetic diagram showing an inhibitory effect against the occurrence of seed-borne viruses according to an embodiment of the present invention.

As shown in FIG. 2, the action mechanism of the plant disease control composition of the present invention inhibits the transfer of the plant viruses through plant phloem. In FIG. 2, (b) presents the mechanism on the transmission of seed-borne viruses from seeds to seedlings, and In FIG. 2, (a) shows the virostatic effect of the plant disease control composition of the present invention against the viruses present in the inner and outer seed coats to prevent viral transmission from seeds to seedlings. This means that in case of all the seed-borne viruses, soaking the seeds in the plant disease control composition for a given period of time can stop the activities of the viruses in the inner and outer seed coats and thus prevent viral transmission and infection to the seedlings.

Hereinafter, a description will be given as to an embodiment of the plant disease control composition for seed soaking prepared using the method for preparing a plant disease control composition for seed soaking.

Example

Firstly, boron (B) and molybdenum (Mo) were dissolved in an acidic water at 40° C. to prepare a first aqueous solution. Copper (Cu) and manganese (Mn) were dissolved in the first aqueous solution, which was being under agitation at 40° C. at a rate of 1,730 $rpm/min^{-1}$, to prepare a second aqueous solution. Potassium oxide ($K_2O$) and nitrogen (N) were dissolved in the second aqueous solution at 35° C., and agitation was then carried out at 23° C. to prepare a third aqueous solution. The third aqueous solution was left to undergo natural sedimentation for 8 to 12 hours and then centrifuged to prepare a first pure undiluted solution. At 35° C., phosphoric anhydride ($P_2O_5$) and zinc (Zn) were dissolved under separate agitation to prepare a fourth aqueous solution. The fourth aqueous solution containing a mixture of dissolved phosphoric anhydride ($P_2O_5$) and zinc (Zn) was left to undergo natural sedimentation and then centrifuged to prepare a second pure undiluted solution. Subsequently, the second pure undiluted solution was aged at low temperature of 10 to 15° C. The first and second pure undiluted solutions were independently bottled for storage and, whenever needed, mixed together at a mixing ratio of 1:1 for use in soaking seeds.

In order to examine the effect of the treatment with the plant disease control composition of the present invention on the vitality of plants, an evaluation was conducted in regards to the germination ability of seeds under treatment with the plant disease control composition (hereinafter, referred to as "Johnni-der V2 SEI") in comparison to dry heat treatment.

1. Seed Treatment and Testing on Germination Ability of Seeds

The following experiments were carried out in order to examine the effect of the Johnni-der V2 SEI treatment on the vitality of seeds.

1.1. Testing Material (Seeds)

As seeds, one variety of Banbaek type and one variety of Cheongchang type, very vulnerable to CGMMV infection in actual field, were used. The varieties of cucumber seeds used in the present invention are listed in Table 1.

TABLE 1

| Crop | Types | Cultivars |
|---|---|---|
| Cucumber | Banbag | Baekdadagi |
| Cucumber | Cheongjang | Samcheok |

1.2. Seed Treatment

Figure 3:
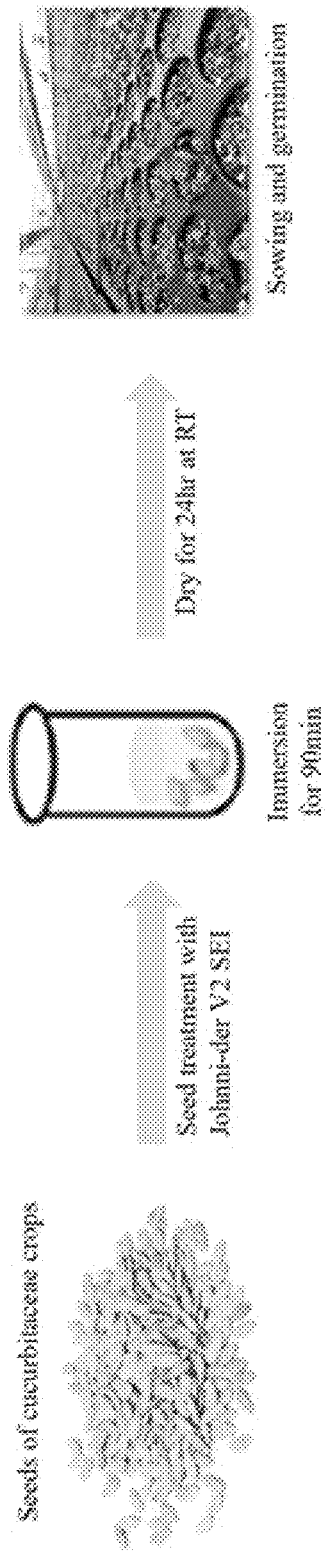
FIG. 3 is a mimetic diagram showing the seed treatment process according to an embodiment of the present invention.

Seeds were divided into five groups: (a) a Johnni-der V2 SEI-treated group, (b) a distilled water-treated control group, (c) a dry heat treatment (70° C., 72 hrs) group, (d) a dry heat treatment (73° C., 72 hrs) group, and (e) a untreated group. As shown FIG. 3, the seeds for the Johnni-der V2 SEI treatment group (a) were soaked in a 200-fold dilution of Johnni-der V2 SEI for 90 minutes, and those for the control group (b) were soaked in distilled water. All the seeds were dried out at room temperature for 24 hours before used for testing.

1.3. Testing on Seed Germination Ability 1.3.1. Test Method

For seedling emergence, a 162-cell seedling plug tray was filled with potting soil potting soil and watered enough to have water drainage through drain holes. For each treatment, three replicates of 72 seeds were used. For each replicate, seeds were sowed at the depth of 1 cm in each cell of the tray and grown in a plant nursery maintained at temperature 18 to 28° C. and relative humidity 40 to 70%. The tray was daily watered according to the dryness of the potting soil whenever the surface of the potting soil got slightly dry.

The number of seedlings with the seed leaves fully emerged on the potting soil 3 days after sowing was determined as seedling emergence. The percentage emergence (PE) of seedlings was calculated as given by:

$$\text{Percentage emergence}(PE) = \frac{\text{Total number of emerged seedlings}}{\text{Total number of seeds used}} \times 100$$

1.3.2. Test Results

In order to assess the effect of dry heat treatment on seed germination, the seeds of two cucumber varieties were treated by 72 hours of dry heat treatment at 70° C. and 73° C. and then monitored for seed germination to determine the germination rate. As a result, the dry heat treatment (70° C.) group had almost no difference in the germination rate from the untreated group, and the dry heat treatment (73° C.) group showed somewhat lower germination rate. The effect of seed treatment on germination rate is presented in Table 2.

TABLE 2

| | Seed treatment | | |
|---|---|---|---|
| Cultivar | Treatment | Time | PE (%) |
| Baekdadagi | Johnni-der V2 SEI treated | 90 min | 98.1a** |
| | Water treated | 90 min | 98.1a |
| | Dry-heat treated at 70° C. | 72 hr | 89.8b |
| | Dry-heat treated at 73° C. | 72 hr | 86.1b |
| | Untreated* | — | 96.3a |
| Samcheok | Johnni-der V2 SEI treated | 90 min | 98.6a |
| | Water treated | 90 min | 98.1a |
| | Dry-heat treated at 70° C. | 72 hr | 89.4b |

TABLE 2-continued

| Cultivar | Treatment | Time | PE (%) |
|---|---|---|---|
| | Dry-heat treated at 73° C. | 72 hr | 88.9b |
| | Untreated* | — | 97.7a |

*Untreated seeds came from a seed package.
**Column mean separated by Duncan's multiple range test (P = 0.05).
The seeds treated with Johnni-der V2 SEI showed a higher germination rate with a statistical significance than the dry-heat treated seeds and had no statistical difference in the germination rate from the untreated seeds or the seeds treated with distilled water.

Accordingly, the seeds treated with Johnni-der V2 SEI were no longer inferior in germination rate to the distilled water-treated seeds or the untreated seeds and hence considered to be practically available.

2. Testing on Inhibitory Effect of Johnni-Der V2 SEI Against Seed-Borne CGMMV Infection It is reported that the seed contamination rate of CGMMV is 80 to 100% and that the seed-to-seedling transmission rate caused by seed contamination is as low as about 1 to 3%. Yet, being susceptible to mechanical transmission, CGMMV is likely to be transmitted through cultivation operations during cultivation period.

In order to evaluate the inhibitory effect of the seed treatment against seed-to-seedling transmission of CGMMV and occurrence of CGMMV disease in the cultivation field, seeds were treated with Johnni-der V2 SEI and then cultivated according to conventional practices, followed by carrying out a testing on the inhibition rate against the onset of CGMMV disease in the actual field.

This procedure was performed to propose a most stable, effective CGMMV control method to the actual cucumber growers.

2.1. Testing Materials and Seed Treatment

Testing seeds used for evaluation on the inhibitory effect of Johnni-der V2 SEI against occurrence of CGMMV disease were the seeds of susceptible cucumber varieties (Baekdadagi, Banbag type) gathered from the field where CGMMV had occurred. The seeds were divided into two groups: (a) a Johnni-der V2 SEI-treated group; and (b) an untreated control group.

The seeds for the Johnni-der V2 SEI-treated group (a) were soaked in a 200-fold dilution of Johnni-der V2 SEI for 90 minutes, and those for the control group (b) were soaked in distilled water for 90 minutes. Then, all the seeds were dried out at room temperature for 24 hours before used for the testing.

2.2. Investigation of CGMMV Disease Incidence in Testing Field 2.2.1. Testing Method A field test was performed to investigate the inhibitory effect of Johnni-der V2 SEI against the seed-borne CGMMV infection. The field test was carried out for 7 months from Oct. 15, 2020 to May 15, 2021 according to the general farmhouse cultivation practices. There were two test groups, (a) Johnni-der V2 SEI-treated group and (b) untreated group, each containing at least 1,000 cucumber seeds. The treatments were arranged in a randomized complete block design with three replicates per treatment.

The individual seeds were sowed in 32-cell seedling tray, cultivated in a nursery greenhouse, and transplanted in a greenhouse at 30×100 cm intervals 30 days after sowing.

In order to avoid the infection with viruses transmitted by insect vectors, the intrusion of insect vectors from outside was prevented with insect screen installed on the side windows and doors of the greenhouse. Besides, application of fungicide and insecticide were carried out every 7 days after transplanting for the sake of preventing the occurrence of disease and insect pest in addition to CGMMV.

As shown in Table 3, the symptoms of virus infection first appeared in the untreated group 20 days after transplanting. The leaves or fruits of cucumber plants with typical symptoms of virus infection, such as mosaic, mottle, chlorosis, necrosis, and vein banding, were diagnosed by the RT-PCR (Reverse Transcription Polymerase Chain Reaction) method to confirm the presence or absence of Cucumber green mottle mosaic virus (CGMMV) or other types of virus.

As for the disease incidence, the plants were visually examined for the symptoms of the virus infection by groups. Johnni-der V2 SEI being an infection inhibitor (a preventive agent) suppressing virus infection on seedlings during seed germination, the efficacy was calculated by counting infected plants to determine the control value as follows. The minimum disease incidence of the untreated group to enhance reliability was set to 10%. Subsequently, the investigation was conducted six times at 30-day intervals according to the growth stage of the cucumber.

Control value=(Disease incidence of untreated group)−(Disease incidence of treated group)/ (Disease incidence of untreated group)×100

TABLE 3

| Seed treatment | Sowing date | Transplant | First symptom appeared | Date of final investigation |
|---|---|---|---|---|
| Johnni-der V2 SEI treated | 2020.9.15 | 2020.10.15 | 2020.01.23 (110 DAT*) | 2021.4.23 (200 DAT) |
| Untreated | 2020.9.15 | 2020.10.15 | 2020.11.04 (28 DAT) | 2021.4.23 (200 DAT) |

*Days after transplanting 2.2.2. Test Results

In order to investigate the pattern of seed-borne CGMMV infection and the inhibitory effect of Johnni-der V2 SEI against seed transmission of CGMMV, the seeds treated in Section 2.1 were grown and transplanted, and the CGMMV disease incidence by the test group was determined.

The first appearance of the symptoms of virus infection in the untreated group was confirmed 20 days after transplanting. The leaves or fruits of cucumber plants with the symptoms of virus infection in the untreated group were diagnosed by the RT-PCR (Reverse Transcription Polymerase Chain Reaction) method, and those in the Johnni-der V2 SEI-treated group were also subjected to the RT-PCR method to confirm the presence or absence of plant viruses.

Figure 4:
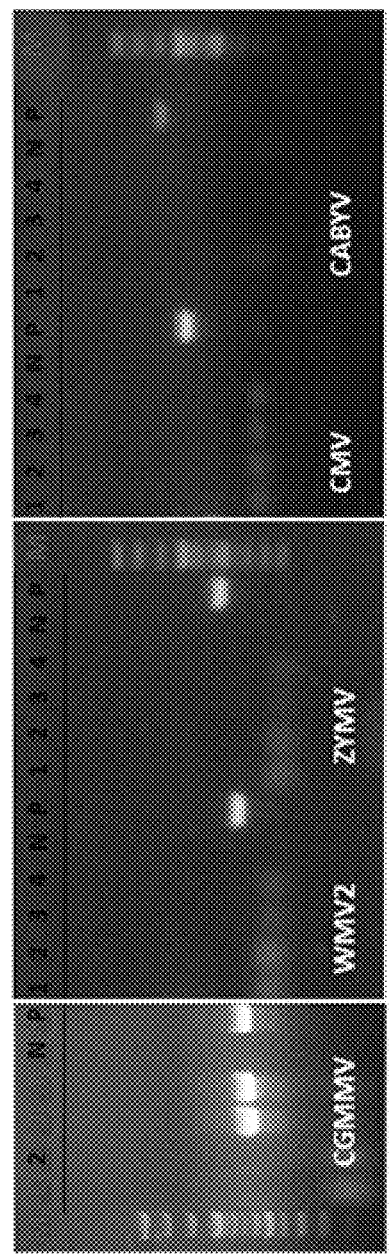
FIG. 4 presents the results of electrophoresis in RT-PCR assay for diagnosis of CGMMV, WMV, ZYMV, CMV, and CABYV according to an embodiment of the present invention.

The RT-PCR diagnostic test revealed that the leaves and fruits of the cucumber plants with marked symptoms of virus infection in the untreated group contained CGMMV. The RT-PCR results are as shown in FIG. 4. FIG. 4 presents the results of RT-PCR agarose gel electrophoresis. Lane 1, the leaf of a cucumber plant in the Johnni-der V2 SEI-treated group; Lane 2, the fruit of a cucumber plants in the Johnni-der V2 SEI-treated group; Lane 3, the leaf of a cucumber plant in the untreated group; and Lane 4, the fruit of a cucumber plant in the untreated group. In FIG. 4, M is the size marker; N (negative control) is the portion not containing a test sample; and P (positive control) is an index indicating the presence of virus. With the same band of P, it is considered that virus infection has occurred.

As shown in FIG. 4, there was no infection with viruses transmitted by aphids, such as Watermelon mosaic virus (WMV), Zucchini yellow mosaic virus (ZYMV), Cucumber mosaic virus (CMV), and Cucurbit aphid-borne yellow virus (CABYV), other than CGMMV infection. It was because the insect screen installed on the side windows and doors of the greenhouse had an effect of preventing the intrusion of insect vectors from outside.

Figure 5:
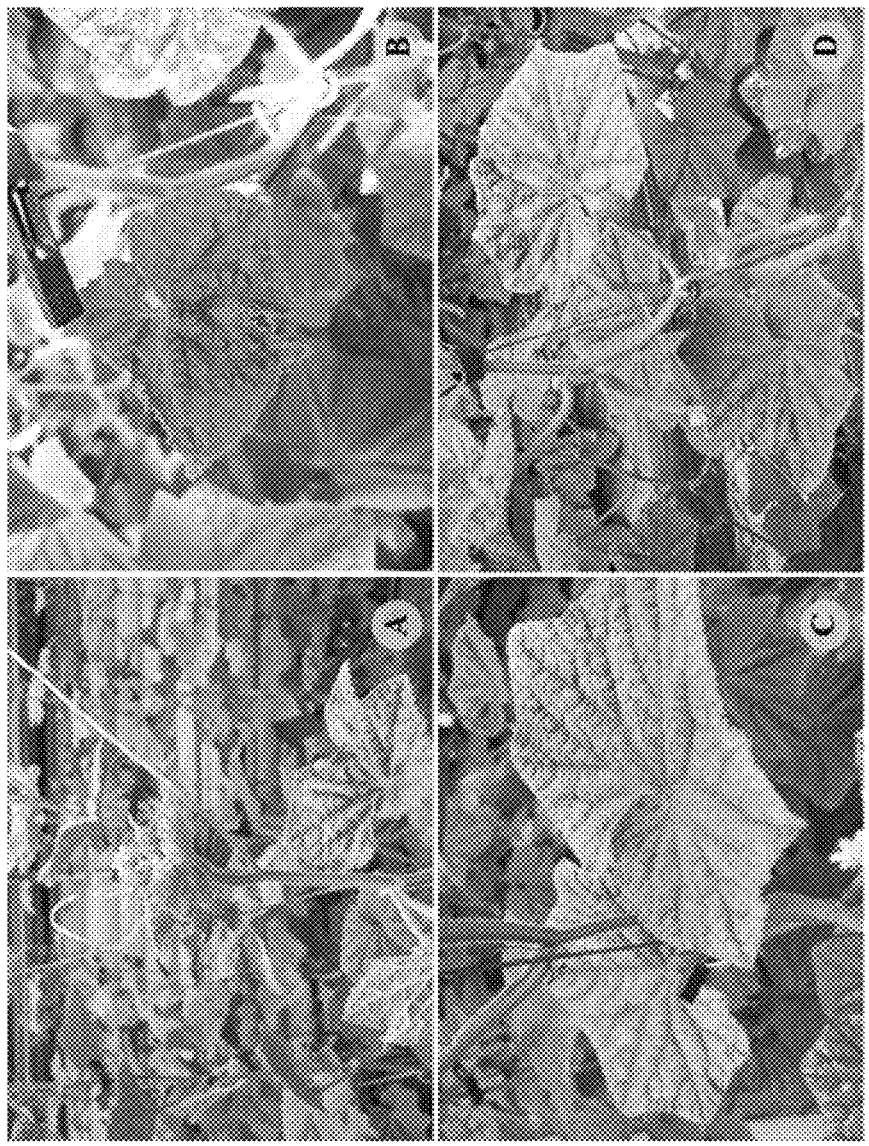
FIG. 5 presents images showing the symptoms of viral infection on the leaves and fruits of CGMMV-infected cucumber plants in the untreated group according to an embodiment of the present invention.

As shown in FIG. 5, the leaves and fruits of a CGMMV-infected cucumber plant in the untreated group had a variety of symptoms of virus infection. The cucumber leaves had main symptoms of mosaic pattern (FIG. 5, A), vein chlorosis, and vein wrinkle (FIG. 5, B). The cucumber fruits mostly had a main symptom of malformation (FIG. 5, D) along with mosaic pattern. CGMMV, generally known to cause mosaic pattern or malformation in cucumbers, resulted in the same symptoms, that is, mosaic pattern or malformation. Yet, the cucumbers in the Johnni-der V2 SEI-treated group had no symptom of virus infection.

Figure 6:
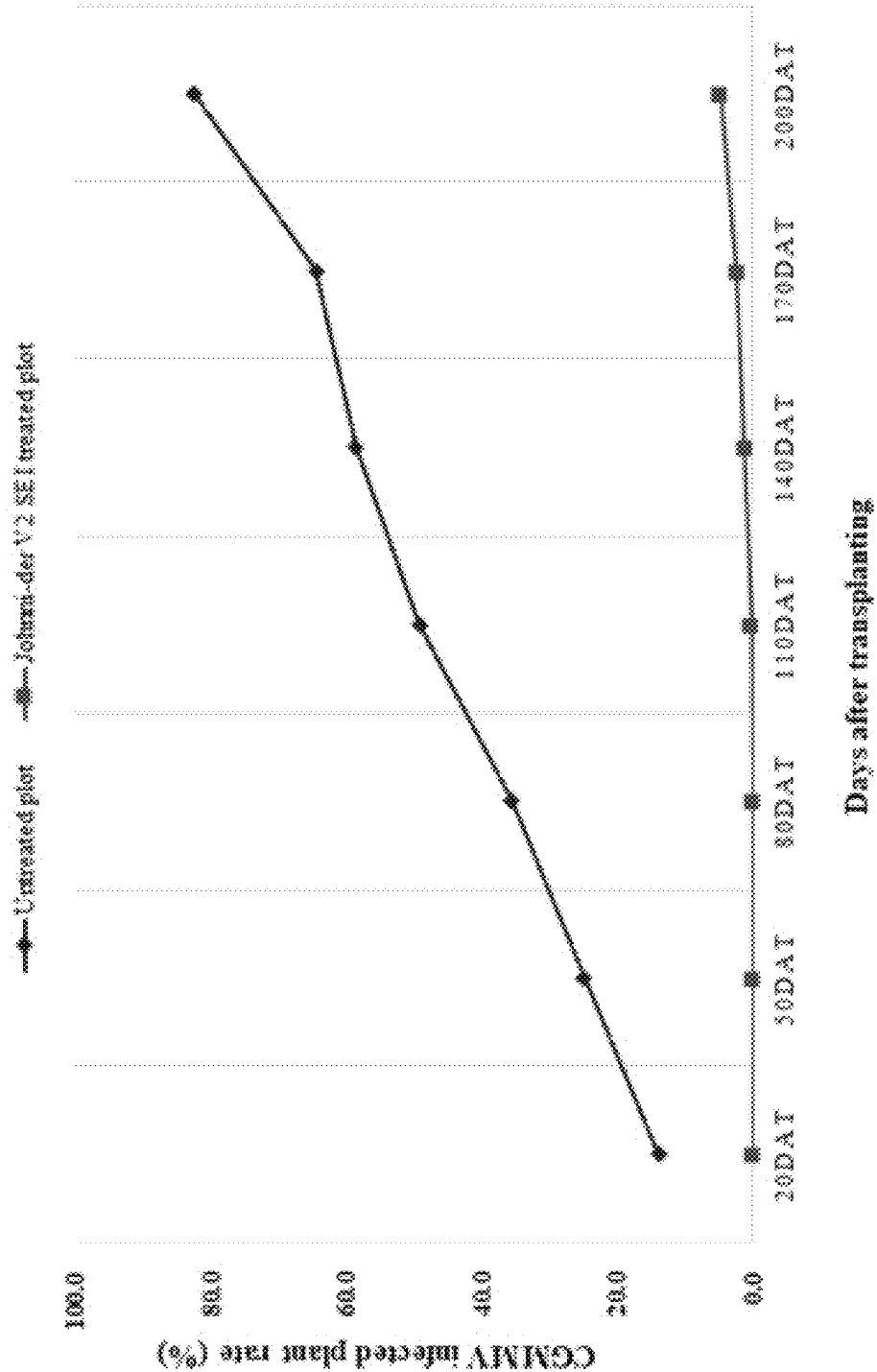
FIG. 6 is a graph showing the CGMMV disease incidence of cucumber plants under seed treatment as a function of the cultivation period according to an embodiment of the present invention.
Figure 7:
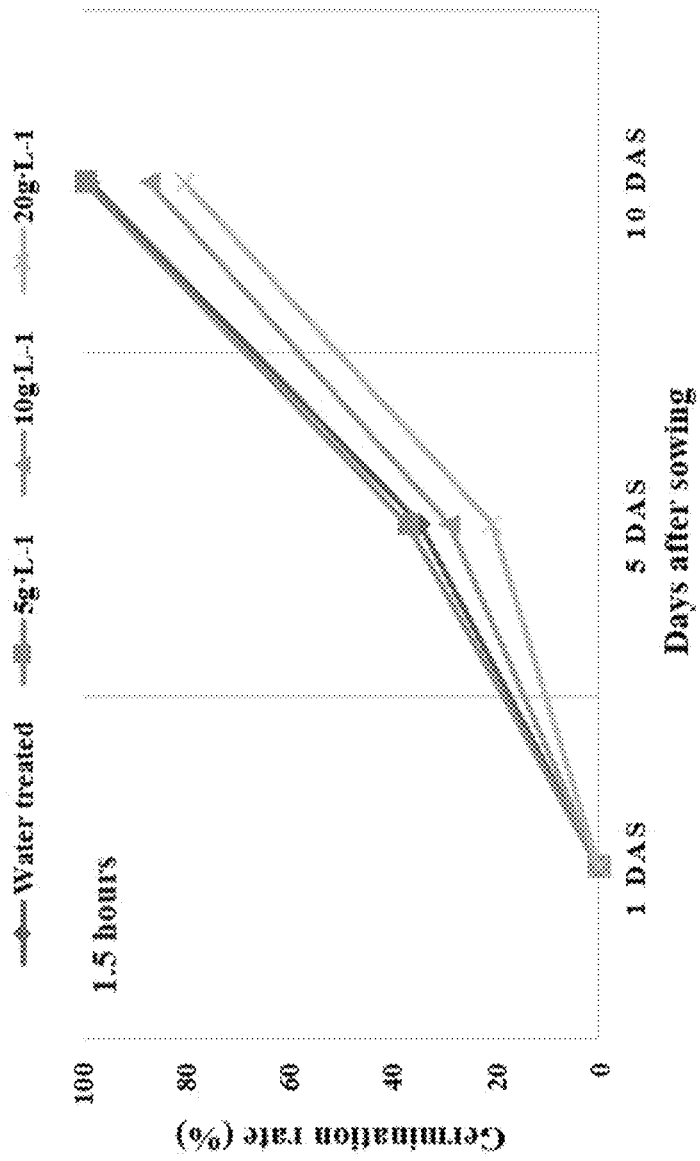
FIG. 7 is a graph showing the percentage emergence of seedlings after 1.5 hour of seed soaking as a function of the concentration of the plant disease control composition according to an embodiment of the present invention.
Figure 8:
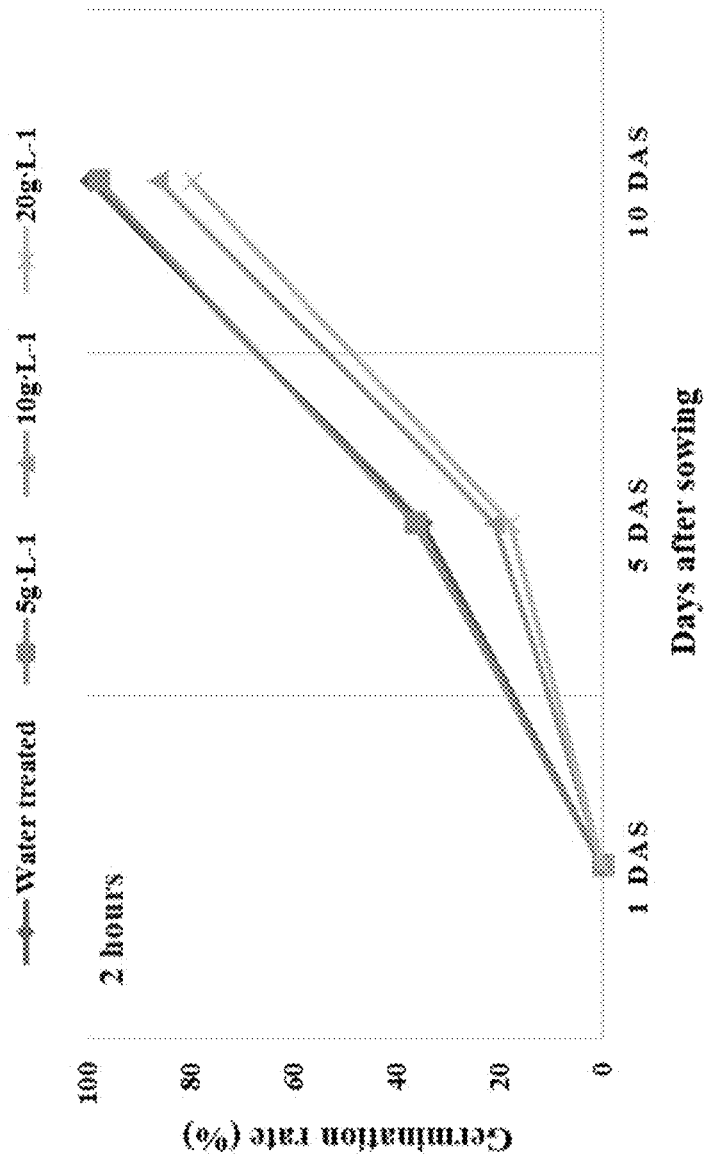
FIG. 8 is a graph showing the percentage emergence of seedlings after 2 hours of seed soaking as a function of the concentration of the plant disease control composition according to an embodiment of the present invention.
Figure 9:
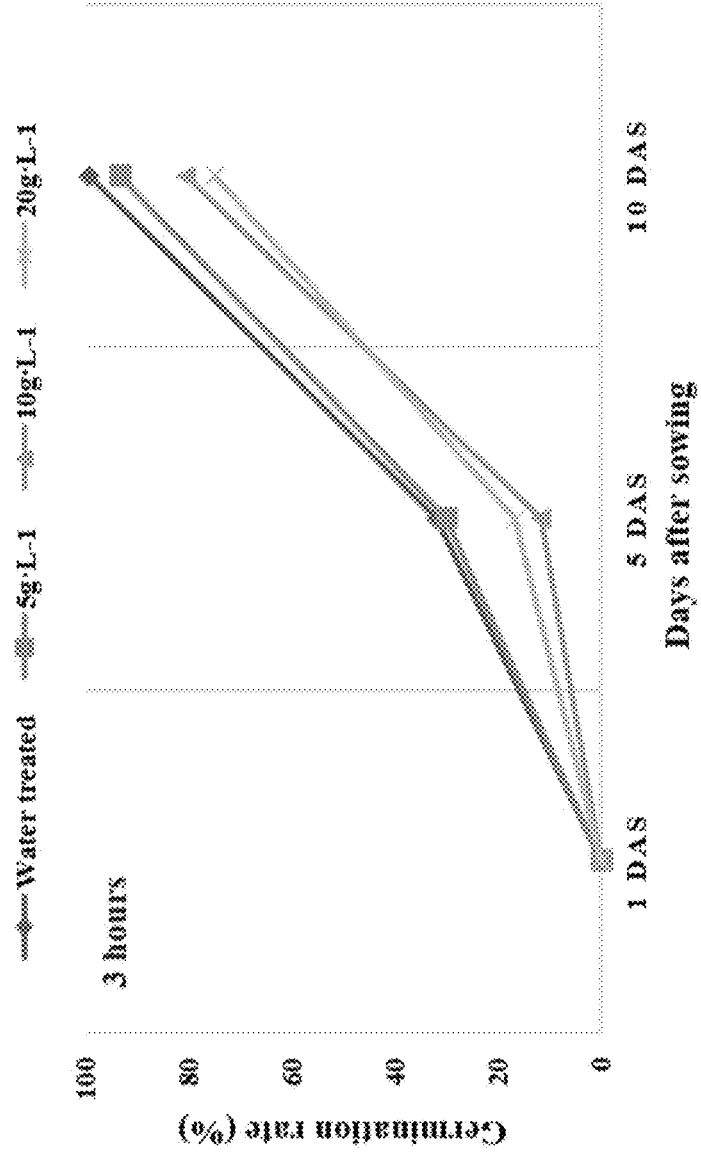
FIG. 9 is a graph showing the percentage emergence of seedlings after 3 hours of seed soaking as a function of the concentration of the plant disease control composition according to an embodiment of the present invention.
Figure 10:
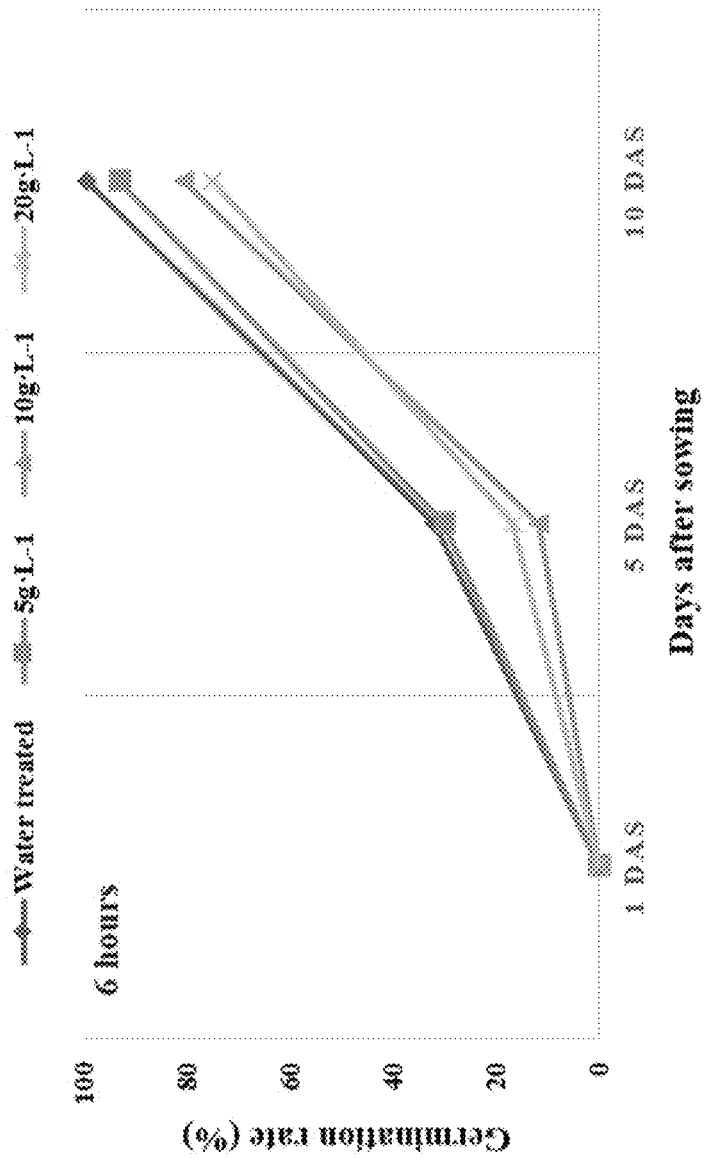
FIG. 10 is a graph showing the percentage emergence of seedlings after 6 hours of seed soaking as a function of the concentration of the plant disease control composition according to an embodiment of the present invention.
Figure 11:
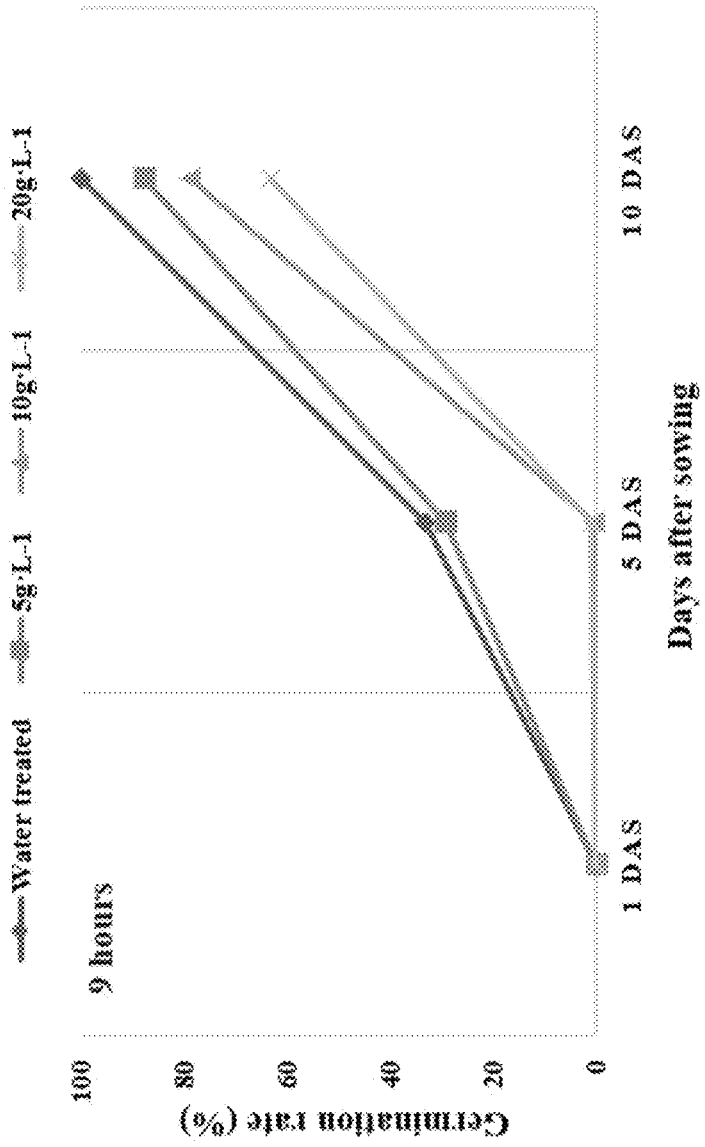
FIG. 11 is a graph showing the percentage emergence of seedlings after 9 hours of seed soaking as a function of the concentration of the plant disease control composition according to an embodiment of the present invention.

During the cultivation period, the disease incidence of the untreated group continued to increase. The CGMMV disease incidence of the untreated group amounted to 13.9% 20 days after transplanting, i.e., in the vegetative stage, and 24.9% 50 days after transplanting, i.e., in the fruiting stage, as shown in FIG. 6 and Table 4; and increased to 35.6% 80 days after transplanting, as shown in FIG. 6 and Table 5.

TABLE 4

| Seed treatment | Infected plant rate (%) | | | | Control value (%) |
|---|---|---|---|---|---|
| | Rep.1 | Rep.2 | Rep.3 | Mean* | |
| Johnni-der V2 SEI treated | 0.0 | 0.0 | 0.0 | 0.0a | 100.0 |
| Untreated | 12.0 | 13.8 | 16.0 | 13.9b | — |

*Values followed by the same letter within a column as detemined by Duncan's multiple range test are not significantly different ($p \leq 0.05$).

TABLE 5

| Seed treatment | Infected plant rate (%) | | | | Control value (%) |
|---|---|---|---|---|---|
| | Rep.1 | Rep.2 | Rep.3 | Mean* | |
| Johnni-der V2 SEI treated | 0.0 | 0.0 | 0.0 | 0.0a | 100.0 |
| Untreated | 25.0 | 23.1 | 26.7 | 24.9b | — |

*Values followed by the same letter within a column as detemined by Duncan's multiple range test are not significantly different ($p \leq 0.05$).

The symptoms of CGMMV disease were first confirmed in the Johnni-der V2 SEI-treated group 110 days after transplanting. 110 days after transplanting, the CGMMV disease incidence was 0.3% in the Johnni-der V2 SEI-treated group and 49.2% in the untreated group, as shown in FIG. 6 and Table 6. 140 days after transplanting, the CGMMV disease incidence was 1.2% in the Johnni-der V2 SEI-treated group and 58.6% in the untreated group, as shown in FIG. 6 and Table 7. 170 days after transplanting, the CGMMV disease incidence was 2.5% in the Johnni-der V2 SEI-treated group and 64.5% in the untreated group, as shown in FIG. 6 and Table 8. In the final investigation 200 days after transplanting, the CGMMV disease incidence was 4.9% in the Johnni-der V2 SEI-treated group and 82.4% in the untreated group, as shown in FIG. 6 and Table 9. The results showed that the CGMMV transmission rate in the untreated group increased rapidly, while that in the Johnni-der V2 SEI-treated group increased very gradually.

TABLE 6

| Seed treatment | Infected plant rate (%) | | | | Control value (%) |
|---|---|---|---|---|---|
| | Rep.1 | Rep.2 | Rep.3 | Mean* | |
| Johnni-der V2 SEI treated | 0.2 | 0.5 | 0.2 | 0.3a | 99.39 |
| Untreated | 46.7 | 50.1 | 50.9 | 49.2b | — |

*Values followed by the same letter within a column as determined by Duncan's multiple range test are not significantly different ($p \leq 0.05$).

TABLE 7

| Seed treatment | Infected plant rate (%) | | | | Control value (%) |
|---|---|---|---|---|---|
| | Rep.1 | Rep.2 | Rep.3 | Mean* | |
| Johnni-der V2 SEI treated | 1.0 | 1.1 | 1.6 | 1.2a | 99.98 |
| Untreated | 56.7 | 59.2 | 59.9 | 58.6b | — |

*Values followed by the same letter within a column as determined by Duncan's multiple range test are not significantly different ($p \leq 0.05$).

TABLE 8

| Seed treatment | Infected plant rate (%) | | | | Control value (%) |
|---|---|---|---|---|---|
| | Rep.1 | Rep.2 | Rep.3 | Mean* | |
| Johnni-der V2 SEI treated | 1.2 | 2.5 | 3.7 | 2.5a | 96.12 |
| Untreated | 68.5 | 63.7 | 61.2 | 64.5b | — |

*Values followed by the same letter within a column as determined by Duncan's multiple range test are not significantly different ($p \leq 0.05$).

TABLE 9

| Seed treatment | Infected plant rate (%) | | | | Control value (%) |
|---|---|---|---|---|---|
| | Rep.1 | Rep.2 | Rep.3 | Mean* | |
| Johnni-der V2 SEI treated | 4.5 | 5.2 | 5.1 | 4.9a | 94.05 |
| Untreated | 79.5 | 82.6 | 85.1 | 82.4b | — |

*Values followed by the same letter within a column as determined by Duncan's multiple range test are not significantly different ($p \leq 0.05$).

In conclusion, CGMMV is a virus transmitted by to seed, soil and sap, yet it is primarily transmitted through seeds (Choi, 2001; Lie et al., 2013; Wu et al., 2011). Most of all, seed transmission is responsible for the viral infection of crops in the early stage and plays a role as a means of viral infection during cultivation period. The secondary transmission is mainly contact transmission, which involves transmitting virus throughout the field through cultivation operations.

It was considered that the appearance of CGMMV symptoms in the untreated group 20 days after transplanting resulted from seed transmission and that the seed transmission in the subsequent cultivation period served as a primary means of transmission of CGMMV to spread the viral infection and rapidly increase the disease incidence. In contrast, the appearance of CGMMV symptoms in the Johnni-der V2 SEI-treated group was not visually confirmed before 80 days after transplanting. This demonstrated from the field that the seed treatment using Johnni-der V2 SEI inhibited the seed transmission of CGMMV and had an effect to produce healthy seedlings.

The appearance of CGMMV symptoms in the Johnni-der V2 SEI-treated group was confirmed 110 days after transplanting. The primary cause of this was considered the mechanical transmission through cultivation operations during cultivation period in a situation where the untreated group and the treated group were mixed according to the randomized complete block design.

In general, seeds infected with CGMMV act as a primary means of transmission despite a low value of the seedling transmission rate and cause a rapid increase in the virus disease incidence in the actual field. For this reason, there is a demand for efficient seed treatments. The test results revealed that the use of Johnni-der V2 SEI on the seeds liable to serve as a primary means of CGMMV transmission inhibited the seed-to-seeding virus transmission and reduced the disease incidence to less than 5% during cultivation period, which consequently enables normal cultivation. It is therefore necessary to perform the seed treatment using Johnni-der V2 SEI for the sake of effective prevention of CGMMV.

In order to determine an appropriate treatment method using the plant disease control composition, there was carried out an investigation on the effects of the concentration and treatment time of the plant disease control composition used as a seed treatment on the seed germination, seedlings, and growth.

A testing was performed to determine the concentration conditions and the optimal treatment time of the plant disease control composition for seed treatment. There were three concentration-specific test groups, 50-fold (20 $g \cdot L^{-1}$) dilution group, 100-fold (10 $g \cdot L^{-1}$) dilution group, and 20-fold (5 $g \cdot L^{-1}$) dilution group. Each concentration-specific test group consisted of 5 time-specific test groups according to the treatment time for soaking seeds, that is, 1.5 hr, 2 hrs, 3 hrs, 6 hrs, and 9 hrs. The untreated group involved soaking the seeds in distilled water for the same time periods.

In each group, three replicates of 50 seeds were soaked. After soaking, each seed was sowed in each cell of a seedling plug tray filled with potting soil. The percentage emergence of seedlings was determined 1 day, 5 days, and 10 days after sowing. The results are presented in Table 10 and FIGS. 7 to 11.

TABLE 10

| Concentration | Soaking | Germination Rate (%) | | |
|---|---|---|---|---|
| ($g \cdot L^{-1}$) | hours | 1 DAS* | 5 DAS | 10 DAS |
| Water treated | 1.5 | 0.0 | 34.7 | 99.0 |
| | 2 | 0.0 | 35.0 | 99.3 |
| | 3 | 0.0 | 32.0 | 99.3 |
| | 6 | 0.0 | 34.3 | 97.3 |
| | 9 | 0.0 | 33.3 | 100.0 |
| 20 | 1.5 | 0.0 | 20.7 | 80.3 |
| | 2 | 0.0 | 18.0 | 79.7 |
| | 3 | 0.0 | 16.7 | 75.0 |
| | 6 | 0.0 | 2.0 | 70.7 |
| | 9 | 0.0 | 1.0 | 63.3 |
| 10 | 1.5 | 0.0 | 29.0 | 87.3 |
| | 2 | 0.0 | 21.0 | 86.3 |
| | 3 | 0.0 | 11.7 | 80.7 |
| | 6 | 0.0 | 1.0 | 79.3 |
| | 9 | 0.0 | 0.3 | 78.7 |
| 5 | 1.5 | 0.0 | 37.0 | 99.7 |
| | 2 | 0.0 | 36.3 | 97.7 |
| | 3 | 0.0 | 30.3 | 93.3 |
| | 6 | 0.0 | 30.3 | 89.3 |
| | 9 | 0.0 | 29.3 | 87.7 |

*Days after sowing.

As can be seen from Table 10 and FIGS. 7 to 11, the percentage emergence of seedlings decreased with an increase in the concentration and soaking time of the composition. For the test groups treated with the composition at concentration of 20 $g \cdot L^{-1}$, the percentage emergence of seedlings was 80.3% in the test group treated for 1.5 hour and 63.3% in the test group treated for 9 hours. For the test groups treated with the composition at concentration of 10 $g \cdot L^{-1}$, the percentage emergence of seedlings was 87.3% in the test group treated for 1.5 hour and 78.7% in the test group treated for 9 hours. For the test groups treated with the composition at concentration of 5 $g \cdot L^{-1}$, the percentage emergence of seedlings was 99.7% in the test group treated for 1.5 hour and 87.7% in the test group treated for 9 hours. In conclusion, the longer soaking time in the test groups treated with the composition at concentration of 5 $g \cdot L^{-1}$, 10 $g \cdot L^{-1}$, or 20 $g \cdot L^{-1}$ led to the lower percentage emergence of seedlings.

In other words, the percentage emergence of seedlings decreased with an increase in the concentration and soaking time of the plant disease control composition. Accordingly, the desirable treatment conditions in regards to the concentration and soaking time of the plant disease control composition were chosen as a concentration of 5 $g \cdot L^{-1}$ and a soaking time of 1.5 hour, under which conditions, the test group was not significantly different in the percentage emergence of seedlings from the untreated group.

According to the solution to the problem with the prior art, the present invention has virostatic effects of inhibiting the virus replication and the transmission of viruses in the plants, alleviating the symptoms in the infected plants, and suppressing the spread of viruses to healthy plants by mechanical contact.

The present invention also has an effect of preventing the occurrence of virus when used before the occurrence of the virus infection.

The present invention also has an effect of accelerating the crop growth to promote the plant growth.

As described above, it would be apparent to those skilled in the art that the above-described technical configuration of the present invention may be implemented in other specific forms without changing the technical spirit or essential characteristics of the present invention.

Therefore, the embodiments as described above are to be understood as illustrative and not restrictive in all respects, and the scope of the present invention is indicated by the following claims rather than the above-detailed description. The present invention should be construed as including all the changes or modifications derived from the spirit and scope of the claims and equivalent concepts thereof.

EXPLANATION OF REFERENCE NUMBER

10. Plant cell
11. Cell wall
12. Cell membrane
13. Plasmodesmata
14. Nucleus
15. Cytoplasm
20. Virus particles

What is claimed is:

1. A method for preparing a plant disease control composition for seed soaking of cucurbitaceae or solanaceae crops, the method comprising mixing nitrogen (N), phosphoric anhydride ($P_2O_5$), potassium oxide ($K_2O$), boron (B), manganese (Mn), molybdenum (Mo), zinc (Zn), copper (Cu), and a surfactant, wherein the plant disease control composition for seed soaking is prepared by a method comprising:

dissolving boron (B) and molybdenum (Mo) in an acidic water to form a first aqueous solution;

dissolving copper (Cu) and manganese (Mn) in the first aqueous solution under agitation at a rate of 1,700 to 1,750 rpm/min$^{-1}$ to form a second aqueous solution;

dissolving potassium oxide ($K_2O$) and nitrogen (N) in the second aqueous solution, carrying out agitation at a rate of 1,700 to 1,750 rpm/min$^{-1}$ to form a third aqueous solution, allowing natural sedimentation of the third aqueous solution for 8 to 12 hours, and then carrying out a centrifugation to obtain a first pure undiluted solution;

dissolving phosphoric anhydride ($P_2O_5$) and zinc (Zn) under separate agitation to form a fourth aqueous solution;

allowing natural sedimentation of the fourth aqueous solution containing a mixture of phosphoric anhydride ($P_2O_5$) and zinc (Zn) and carrying out a centrifugation to obtain a second pure undiluted solution;

aging the second pure undiluted solution at low temperature of 10 to 15° C.; and mixing the first pure undiluted solution and the second pure undiluted solution with the surfactant, thereby preparing the plant disease control composition.

2. The method for preparing a plant disease control composition for seed soaking of cucurbitaceae or solanaceae crops, according to claim 1, wherein the plant disease control composition has a pH value of 1.0 to 4.5.

\* \* \* \* \*